UNITED STATES PATENT OFFICE.

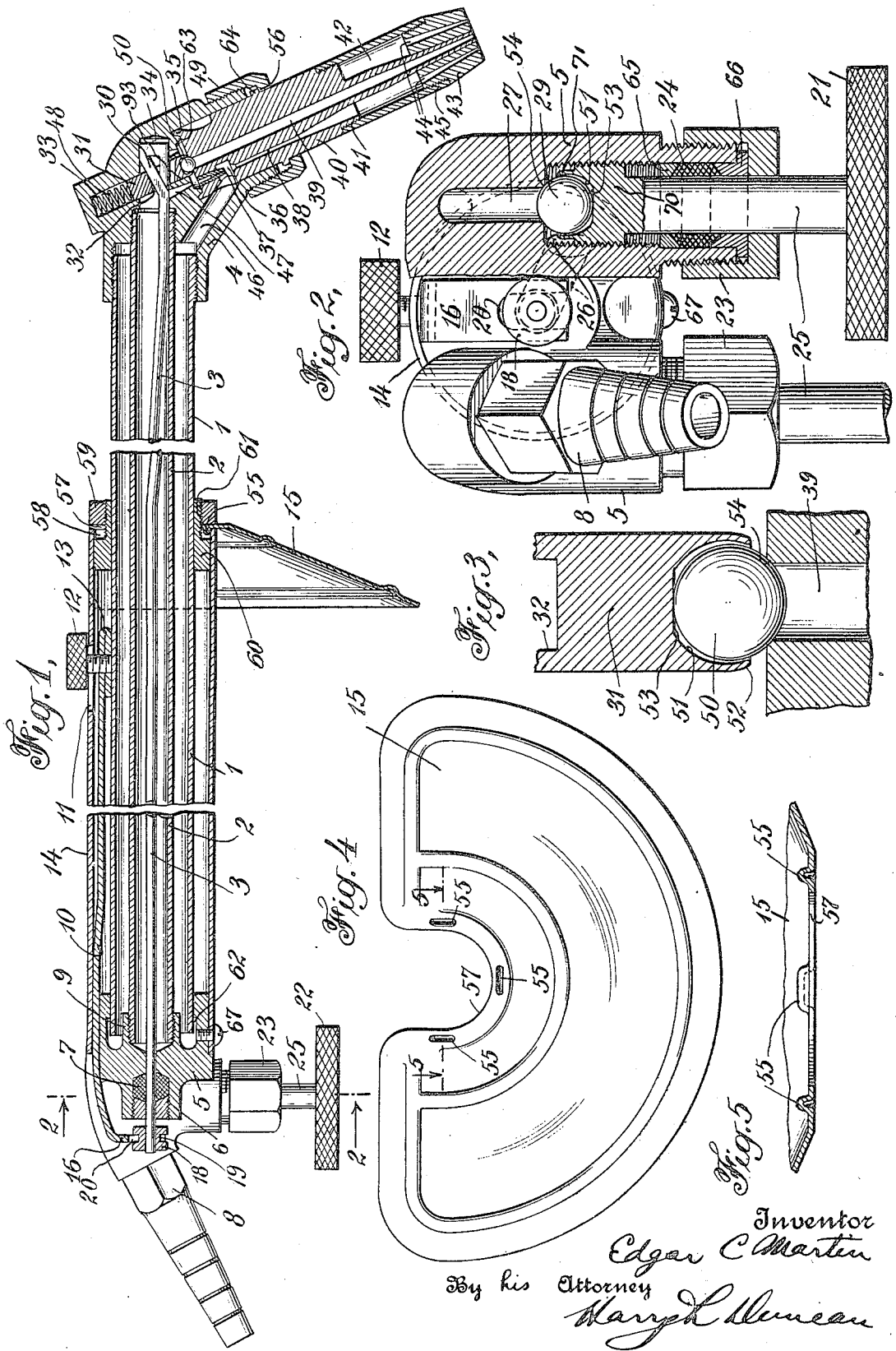

EDGAR C. MARTIN, OF CENTRAL, SOUTH CAROLINA, ASSIGNOR TO PRATT AND CADY COMPANY, INCORPORATED, OF HARTFORD, CONNECTICUT, A CORPORATION OF NEW YORK.

CUTTING OR WELDING BLOWPIPE.

1,237,534.  Specification of Letters Patent.  Patented Aug. 21, 1917.

Application filed May 17, 1916. Serial No. 98,020.

*To all whom it may concern:*

Be it known that I, EDGAR C. MARTIN, a citizen of the United States, and resident of Central, Pickens county, South Carolina, have made a certain new and useful Invention Relating to Cutting or Welding Blowpipes, of which the following is a specification, taken in connection with the accompanying drawing.

This invention relates especially to cutting blowpipes adapted for oxy-acetylene cutting and in which a ball shut-off valve is used to control the cutting jet and to instantly shut off the same in case of necessity, the blowpipe also being preferably provided with a detachable shield which may be readily and securely attached to the blowpipe handle in any desired angular position.

In the accompanying drawing showing in a somewhat diagrammatic way an illustrative embodiment of this invention, Figure 1 is a vertical longitudinal section.

Fig. 2 is an enlarged transverse section taken substantially along the line 2—2 of Fig. 1.

Fig. 3 is an enlarged detail sectional view of the shut off valve and seat.

Fig. 4 is a view of the shield when removed from the blowpipe; and

Fig. 5 is a transverse sectional view thereof taken substantially along the line 5—5 of Fig. 4.

The blowpipe may have any desired construction and may comprise a stem 1 screwed or otherwise secured to the head 4 into which may be screwed the tube 2 having screw connection at its back end with the connector member 5. The stem may also engage this connector member and be soldered or otherwise connected thereto, if desired, a suitable annular recess 62 being preferably formed in this connector member for the passage of gases into the annular space between this tube and stem 1. If desired, the handle such as 14, may be formed around the tube adjacent the connector member to which the handle may be secured as by screws such as 67 and the front portion of this handle may, if desired, be soldered or otherwise connected to a suitable coupling bushing 60.

The gas connections 8 for the acetylene or other heating gas and oxygen or other supporter of combustion therefor may be provided with regulating valves of any suitable construction, and if desired these valves may be of the ball valve type indicated in Fig. 2 as comprising the valve plug 70 which may be threaded within the valve casing provided, if desired, with the gland bushings 65, 66 between which the packing 24 is held by the nut 23. Thus when the handle 21 on the valve stem 25 is rotated the valve plug 70 is advanced a corresponding distance toward the valve seat 54 and the ball valve 29 is carried forward correspondingly. The loose mounting of the ball valve in the plug gives it a self-alining action and allows it to seat itself accurately as it is pushed forward by the actuating surface 53 which is preferably parallel to the valve seat and of sufficient extent to allow some slight lateral adjustment of the valve within the valve socket 51 while the valve is still held by the holding flange 71 on the plug. If desired the oxygen connection may communicate with the oxygen passage 27 which is controlled by the ball valve 29 so that when this valve is open the oxygen passes through the communicating passage 26 into the central tube 2 of the blowpipe so as to supply oxygen to the central cutting passage 39 of the cutting tip 40. If desired, a similar regulating valve may be provided for the acetylene which may be conducted to the tip through the annular passage between the stem 1 and tube 2 communicating with the acetylene passage 46 in the head so as to supply acetylene to the injector casing 36. The acetylene is then drawn by the oxygen jet from the injector nozzle 37 supplying the heating passage 38 communicating with the annular space 42 within the casing 45 screwed at 41 to the tip 40 and similarly secured to the end 43 to thus supply the series of heating jet discharge conduits 44 around the central cutting jet at the end 43 of the tip. It is of course understood that the cutting tip is removable so as to be readily replaced by another interchangeable tip and for this purpose the tip is preferably formed with a projecting ledge 35 adjacent its outer portion while a reduced area joint member 63 is forced into firm engagement with the coöperating part of the tip when the securing collar 49 is screwed onto the head so that its flange 56 engages the coöperating flange 64 on the tip to force it home into the head.

The shut-off valve may be actuated in any desired way as for instance by the actuator bar 10 having a thumb piece 12 outside the handle so as to be convenient for the operator and screwed or otherwise connected to the reinforced or doubled end 13 of the actuator bar adjacent the slot 11 in the handle. This actuator bar may have a yoke 20 at its rear bent end 16 to embrace or engage the annular recess 19 in the nut 18 which may be secured in any way to the end of the actuator rod 3. This rod may as indicated extend through the packing 7 held in the rear of the connector member as by the gland 6 and it may have its forward end formed with the inclined actuator cam 30 located within the recess 34 and arranged to operate the shut-off valve as by coöperating with the inclined socket 32 in the valve plug or support 31. This plug may be guided in the recess 33 and its extension 93 formed in the head substantially in line with the cutting passage 39 in the tip, and if desired a suitable spring such as 48 may be mounted behind the plug so as to exert a closing tendency on the valve. It is desirable to provide this shut-off valve with a loosely mounted ball valve 50 coöperating with the valve seat 54 in the tip as indicated so that any slight lack of alinement between the valve plug and seat may be compensated for and the tight closure of this oxygen shut-off valve insured under operating conditions. For this purpose the valve socket 51 is of such size and form as to allow some slight lateral movement of the valve, a hundredth of an inch or so play on both sides of the valve being desirable while at the same time the valve is held in the plug as by the inwardly flanged over or bent holding flange 52. It is desirable in order to insure the effective closing of the valve to provide the valve plug or support with an alining actuating surface, such as 53, preferably substantially parallel to the valve seat 54, so that the valve is forced evenly home against its seat under all conditions. With this arrangement the shut-off valve may be opened manually by retracting the thumb piece 12 which causes a corresponding rearward movement of the connected actuator cam 30 in its cavity 34, while when necessary the operator can quickly close this shut-off valve by pushing forward the thumb piece and connected actuator device which forces the loosely mounted ball valve tightly against its seat in the tip to effectively shut off this oxygen jet and prevent leakage.

Under some operating conditions it is desirable to have a shield for the operator's hand interposed between the tip of the cutting or welding blowpipe and the handle and it is of considerable advantage to have such a shield detachable and so arranged as to be readily and quickly secured in position and angularly adjusted in some instances about the blowpipe handle. For this purpose the shield 15 which may be of any suitable metal or material and if desired strengthened by reinforcing ribs as indicated may be formed with a circular alining recess or aperture, such as 57, adapted to loosely encircle the coöperating part of the blowpipe so as to be clamped in position thereon as by the retaining collar 59 which may be threaded on the forward extension or threaded neck 61 of the bushing 60. It is also desirable to form suitable locking lugs, such as 55, on the shield adjacent this aperture, a series of such lugs being desirable and preferably formed of such size as to extend within the locking recess 58 on the blowpipe handle or other member. In this way the shield may be readily attached to the blowpipe and securely held thereto by the interlocking action of the locking lugs and recessed handle and by slightly loosening the retainer collar 59 the shield may be swung angularly about the handle of the blowpipe into any desired position and instantly clamped or locked therein. At the same time the shield may be removed from the blowpipe by the operator without the use of any special tools and the retainer collar may then be screwed tightly home against the end of the handle 14, thus giving a finished appearance to this part of the device when the shield is not in use.

Certain features of the construction illustrated and described herein are claimed in my co-pending application Serial No. 102,483, filed June 8, 1916, to which some of this subject-matter has been transferred.

This invention has been described in connection with a number of illustrative embodiments, forms, proportions, arrangements, materials and uses, to the details of which disclosure the invention is not of course to be limited, since what is claimed as new and what is desired to be secured by Letters Patent is set forth in the appended claims.

I claim:

1. The cutting or welding blowpipe comprising a tip and a connected handle formed with an annular locking recess adjacent its forward end, a retainer collar of substantially the same outward diameter as said handle and having threaded connection therewith, and a detachable substantially semi-circular shield of conically dished reinforced construction and formed with a substantially semi-circular aperture to engage said blowpipe adjacent said recess and formed with locking lugs adjacent said aperture to extend within said locking recess and prevent undesirable radial movement between said shield and said handle, said shield being angularly adjustable to be interposed between said tip and handle and being securely held in interlocking engagement with said blowpipe by said retainer collar.

2. The cutting or welding blowpipe comprising a tip and a connected handle formed with an annular locking recess adjacent its forward end, a retainer adjustably connected to said handle, and a detachable substantially semi-circular shield formed with a substantially semi-circular aperture to engage said blowpipe adjacent said recess and formed with lugs adjacent said aperture to extend within said locking recess and prevent undesirable radial movement between said shield and said handle, said shield being angularly adjustable to be interposed between said tip and handle and being securely held in interlocking engagement with said blowpipe by said retainer.

3. A cutting or welding blowpipe comprising a handle formed with an annular locking recess adjacent its forward end, a retaining collar of substantially the same outside diameter as said handle and having threaded connection therewith, and a detachable shield formed with a circular aperture to engage said blowpipe adjacent said recess and with integral locking lugs adjacent said aperture to extend within said locking recess and be securely held in interlocking engagement with said blowpipe by said retainer collar.

4. A cutting or welding blowpipe comprising a handle formed with a locking recess, a retainer collar having threaded connection therewith, and a detachable shield formed with an aperture to engage said blowpipe adjacent said recess and be angularly adjusted with respect thereto and formed with integral locking lugs adjacent said aperture to extend within said locking recess and be securely held in interlocking engagement with said blowpipe by said retainer collar.

5. A cutting or welding blowpipe comprising a handle formed with an annular locking recess, and a detachable shield formed with a circular aperture to engage said blowpipe adjacent said recess and be angularly adjustable with respect thereto and formed with locking lugs adjacent said aperture to extend within said locking recess and be securely held in interlocking engagement with said blowpipe.

6. A cutting or welding blowpipe comprising a handle formed with a locking recess, a retainer collar, and a detachable shield formed to engage said blowpipe adjacent said recess and with a locking lug to extend within said locking recess and be securely held in interlocking engagement with said blowpipe by said retainer collar.

EDGAR C. MARTIN.

Witnesses:
E. T. HASLEHURST,
RAE C. PALMER.